Patented Jan. 13, 1931

1,788,683

UNITED STATES PATENT OFFICE

SWINFEN BRAMLEY-MOORE, OF WHITE PLAINS, NEW YORK

MACHINE FOR BREAKING AND SEPARATING COCOA BEANS

Application filed June 27, 1929. Serial No. 374,166.

The present invention relates to machines for breaking cocoa beans and the like and removing the shells and germs therefrom, and aims to provide a novel and improved machine of that kind which will operate efficiently.

It is the object of the invention to provide a breaking and separating machine for cocoa beans, and the like, having novel means for breaking the beans, novel means for separating the shells from the nibs or broken fragments, and novel means for separating the germs or radicals from the nibs.

Another object of the invention is the provision of a machine of that kind from which stones, pebbles and similar foreign objects may be conveniently removed.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
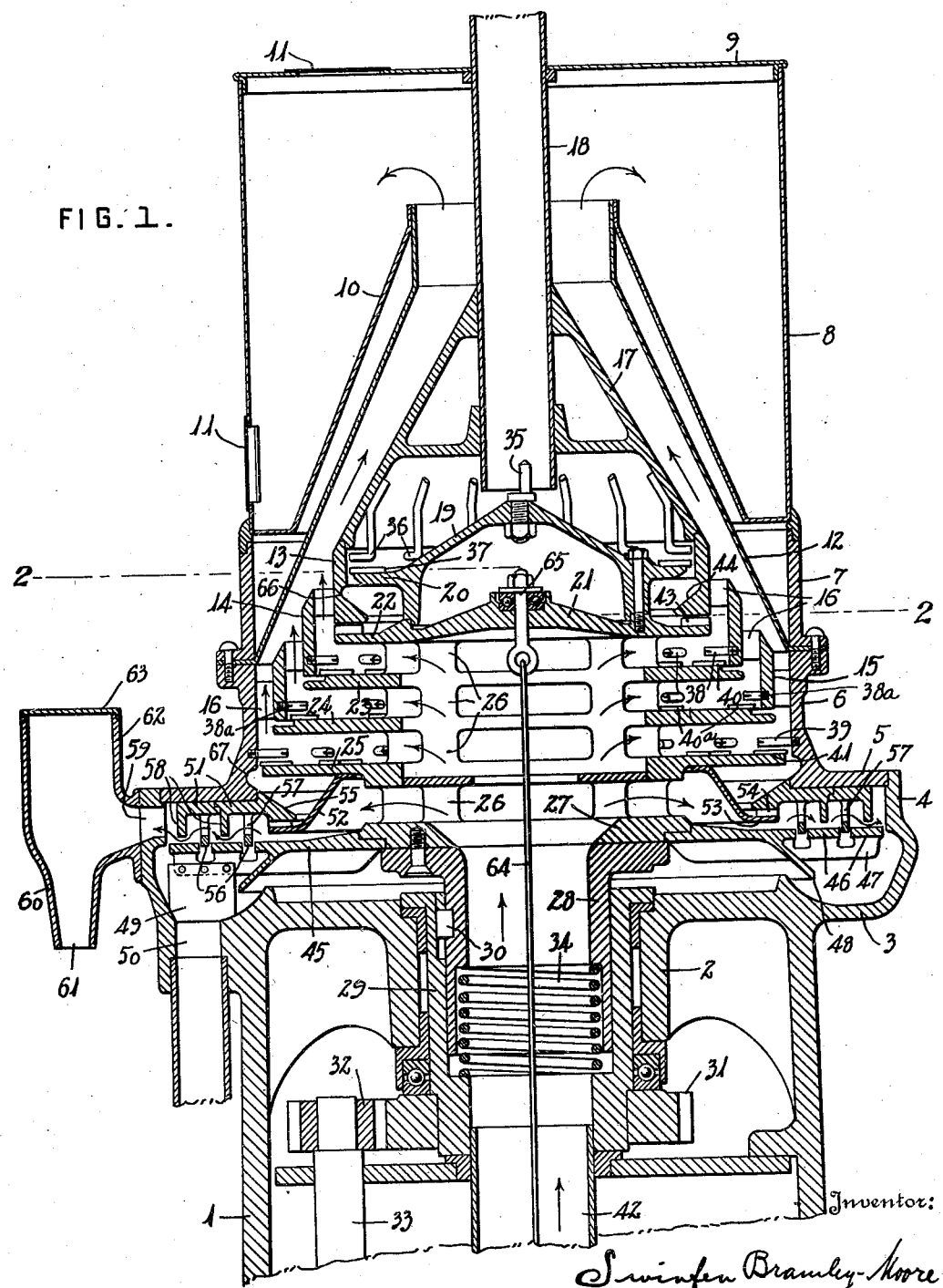
Figure 1 is a vertical median section of the machine.
Figure 2:
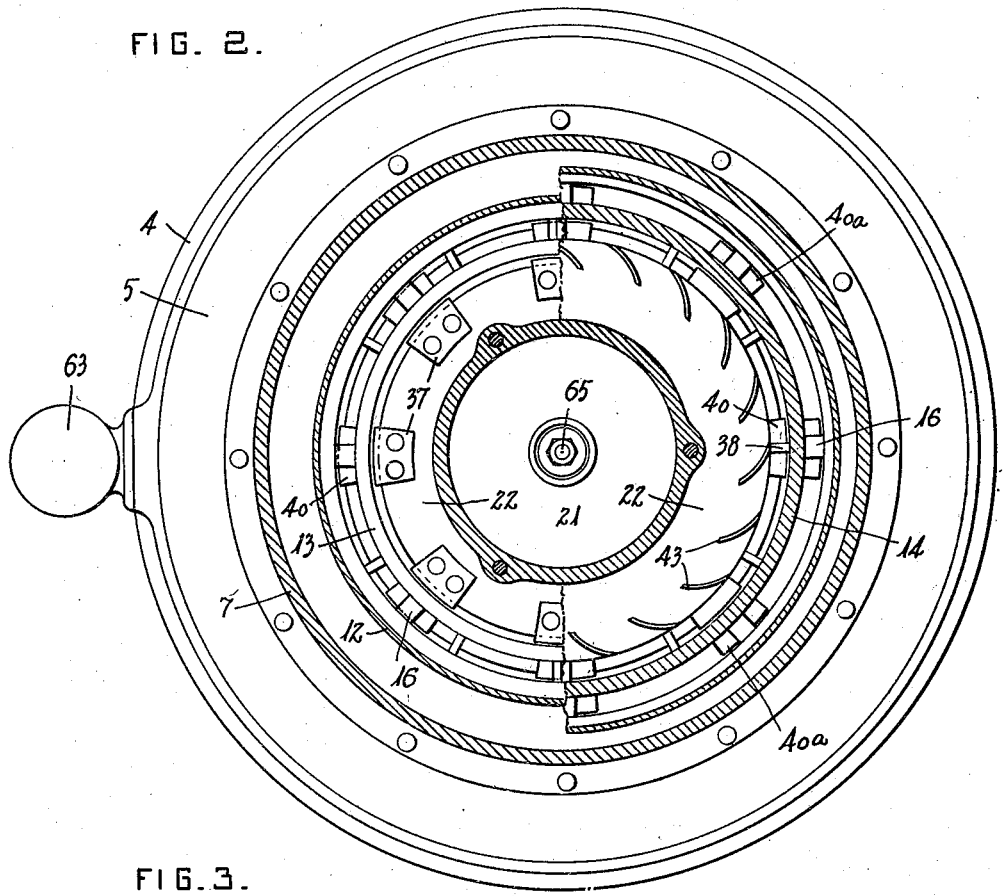
Fig. 2 is a section on the line 2—2 of Fig. 1.

The machine is mounted on a suitable frame or stand 1 having the upper vertical bearing 2 and a surrounding annular germ trough 3 provided with the outer upstanding rim 4 on which is seated and secured the lower outstanding flange 5 of a casing section 6. An upper casing section 7 is secured on the casing section 6, and a shell or husk receptacle 8 is seated on the section 7 and has a removable cover 9.

The bottom of the receptacle 8 has an upstanding cone 10 open at the apex, and the wall and top or cover of the receptacle 8 may have one or more screened openings or ports 11 to permit the escape of air.

A cone 12 is clamped at its lower end between the casing sections 6 and 7 and is open at its apex, and the upper end of the cone 10 fits over the neck of the cone 12. The receptacle 8 may be removable from the casing section 7 and cone 12 to permit convenient dumping of the shells or husks from the receptacle at intervals.

The crushing or breaking means comprises a stator and a rotor having cooperable breaking elements.

The stator has the concentric cylindrical rings 13, 14 and 15 which are preferably cast integral with one another and with the casing section 6, which forms part of the stator, by the spider arms 16 uniting them. Said rings 13, 14, 15 and 6 are arranged in conical formation, the rings being spaced apart radially and being arranged at different heights.

A cone 17, forming part of the stator, is seated and secured on the upper smaller ring 13, and a feed tube 18 extends downwardly through the cone 17 for feeding the cocoa bean or other articles into the machine so as to pass between the rotor and stator.

The rotor comprises an upper cone 19 within the cone 17 and ring 13 and having an outstanding horizontal flange or annular table 20.

The rotor also includes a casting or member 21 having the vertically spaced horizontal annular tables 22, 23, 24 and 25 united by the columns 26 which rise from a base ring 27 that is secured on a neck 28 slidable vertically within a tubular shaft 29 journaled in the bearing 2 of the frame or stand 1. A gear wheel 31 secured on the lower end of the shaft 29 meshes with a pinion 32 on a drive shaft 33, to furnish power for the rotor, the neck 28 having a key or feather 30 engaging the shaft 29 to rotate the rotor with said shaft and permit of vertical movement of the rotor. The rotor is normally raised by a spring 34 confined between the neck 28 and shaft 29.

An eccentric agitator 35 is mounted on the cone 19 and works within the lower end of the tube 18 for agitating the beans so that they will discharge from the tube and roll down the cone 19. The flow of the beans may be regulated by spacing the lower end of the tube 18 different distances above the cone 19.

Breaking fingers or members 36 are secured within the cone 17 above the table 20, and cooperating plates 37 are secured on the table 20 to move under the fingers 36 so that the beans passing outwardly between the fingers 36 and plates 37 will be broken into pieces or nibs. The space or slot between the edge of the table 20 and ring 13 is slightly less than the diameter of a cocoa bean or other article which is to be broken, thereby reqiring the bean to be broken before the pieces or nibs can pass down through said slot below the table 20.

Breaking fingers or members 38, 38a and 39 are secured to the rings 14, 15 and 6, respectively, above the respective tables 23, 24 and 25, and cooperating plates 40, 40a, and 41 are secured on said tables to move under said fingers for breaking the nibs into smaller pieces in succession.

The space or slot between the marginal portion of the table 23 and the lower edge of the ring 14 is slightly narrower than the space between the ring 13 and table 20, requiring the nibs to be broken into smaller pieces before they can pass down between the ring 14 and table 23, and the spaces or slots between the edges of the tables 24, 25 and the rings 15, 6, respectively, are still of less widths in succession so as to require further breaking of the nibs before they can drop down across the edges of the tables 24 and 25.

Thus, as the nibs drop from one table to the next they are broken into smaller pieces.

A blast or stream of air under pressure is delivered through the pipe 42 into the shaft 29 to pass upwardly through the neck 28 of the rotor and thence outwardly between the tables 22, 23, 24 and 25, thereby assisting centrifugal action in moving the nibs outwardly against the rings between the breaking elements. The air passing between the tables and upwardly between the rings, as indicated by the arows, will also carry with it the shells, dust and other lighter particles. The air passes upwardly between the cones 12 and 17 and into the receptacle 8 where the shells, dust and other foreign matter are caught.

In order to prevent the air from passing upwardly into and through the tube 18, the table or disk 22 has fan blades 43 thereon moving under the ring 13, so that by centrifugal action air is drawn down through the tube 18 and forced outwardly between the ring 13 and table 22, thereby opposing the upward flow of air between the rings 13 and 14. The ring 13 has an annular inclined surface 44 below the table 40 for shedding the broken beans onto the table 22 at the inner ends of the blades 43 to be thrown outwardly by centrifugal force, assisted by the downward flow of air from the tube 18 between the ring 13 and table 22.

The means for separating the nibs and germs is located above the trough 3 and includes a rotor and a stator.

The rotor of the separator comprises the horizontal table or disk 45 secured to the base ring 27 of the breaker rotor, and having annular slots forming the annular rings 46 of the table. The rings 46 are supported by arms 47 at the lower surface of the table 45. The table 45 has a flared apron 48 overhanging the inner wall of the trough 3 so that the germs are shed into the trough.

One arm 47 carries a scraper blade or flap 49 which works in the trough 3 to move the germs around the trough to a discharge opening 50 leading downwardly from the bottom of the trough.

The separator stator comprises rings 51 secured under the flange 5, and having the alternate depending annular baffles 56 and 58. The baffles 56 extend down into the slots of the table 45 and have openings 57 above the plane of the table 45, while the baffles 58 are located above the rings 46 and are spaced therefrom. The openings 57 have their lower edges spaced above the plane of the table 45.

The spaces or clearances between the baffles 56 and the edges of the slots of the table are such as to permit the germs to pass down through said slots, which also applies to the space or clearance between the outer ring 46 and the wall or rim 4 of the trough 3, so that the germs may drop into the trough 3, while the nibs cannot pass down through said spaces or clearances.

An annular apron 52 is supported from the table 25 and has lower outturned flange 53 on which are provided fan blades 54, similar to the blades 43, for creating, by centrifugal action, the flow of air outwardly above the rings 46. The blades 54 move under the inner ring 51, which has its upper surface sloping, as at 55, to direct the nibs and germs which fall over the edge of the table 25, to the apron 52 and flange 53 from which the nibs and germs are thrown by centrifugal force and the air current to the separating means. Air is also delivered from the central blast under the table 25 and outwardly between the flange 53 and table 45.

The wall or rim 4 of the trough 3 has a nib outlet 59 above the plane of the table 45.

A separating chamber 60 is secured to the trough rim 4 to receive the nibs from the outlet 49, and said chamber has a depending spout 61 through which the nibs drop into a suitable receiver. Said chamber has an upstanding portion 62 normally closed by a cap 63, and when said cap is removed the chamber 60 will take care of an overloading of the machine.

Thus, if the machine is overloaded so that the shells and dust are not all blown into the receptacle 8, and pass into the nib and germ separator, the shells and dust entering the chamber 60 will be blown upwardly through the open upper end of the chamber 60, while the nibs drop by gravity through the spout 61.

Provision is made for getting rid of stones or pebbles which may enter the machine with the cocoa beans, and which if they remain in the machine would damage the breaking elements and other portions. When stones are present in the machine they are made manifest by the excessive noise produced by the swirling contact of the stones with the metal parts. The feeding of the beans into the machine is then shut off and the machine is operated until it empties itself of nibs, shell and germs, leaving the stones isolated and swirling on the tables. The rotor is then depressed, which is permitted by the yielding support of the rotor by the spring 34, the neck 28 moving downwardly in the sleeve shaft 29. The tables 22, 23 and 24 are thereby moved away from the lower edges of the rings 13, 14 and 15, respectively; the table 20 is moved downwardly to register with an annular groove 66 in the ring 13 to provide sufficient clearance for the passage of the stones; the table 25 is similarly moved downwardly to register with an annular groove 67 in the ring 6 to provide a similar clearance; the flange 53 is moved downwardly away from the corresponding ring 51; and the table 45 is moved downwardly from the baffles 56, so that the stones may drop down from one table to the next through the increased clearances or spaces provided, and the stones will pass down into the trough 3 and out through the outlet 50. To permit of the downward movement of the rotor, the member 49 should be a flexible flap of leather, rubber or similar material.

The rotor may be depressed by any suitable means. As shown, a wire 64 extends upwardly within the central air inlet passage, and is connected by a swivel 65 with the member 21, so that the wire may be drawn downwardly by a suitable lever or other device (not shown).

Any suitable arrangement may be used for shutting off the supply of cocoa beans into the machine, and for depressing the rotor to permit the stones and pebbles to pass out.

Figure 3:
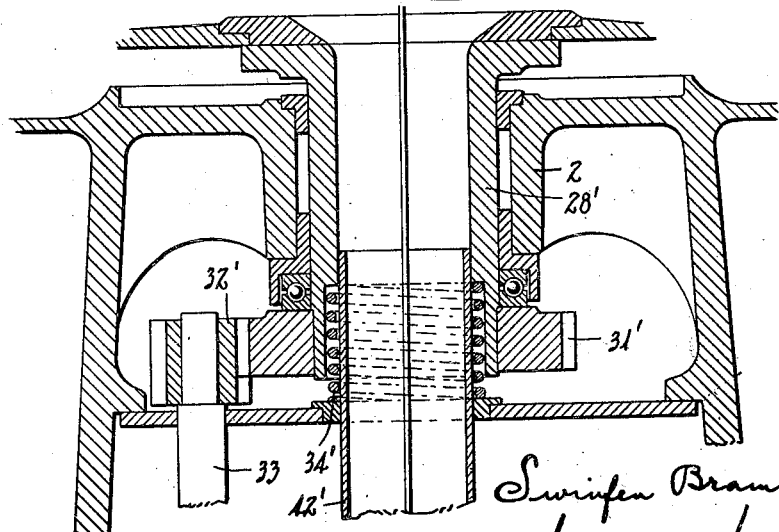
Fig. 3 is a sectional detail illustrating a modification.

Fig. 3 illustrates a modification in that the neck 28' of the rotor is journaled as a tubular shaft in the bearing 2, and has the gear wheel 31' secured thereon meshing with the pinion 32' on the drive shaft 33, and the air blast pipe 42' extends upwardly into the neck 28'. The neck 28' is yieldingly supported by the spring 34', although the spring may be omitted in some instances. The gear wheel 31' and pinion 32' have helical teeth.

The spiral or helical teeth of the pinion 32' exert an axial thrust on the teeth of the wheel 31' when the load is on, so as to raise the rotor to its working position, the spring 34' being used as an auxiliary in the event that the weight of the rotor is excessive as compared with the power being transmitted. When the power is shut off so that the machine slows down, the rotor will gradually gravitate thereby automatically discharging nails, stones and other unbreakable objects, and as soon as the power is put on again, the rotor will be lifted to its normal working position.

The operation of the machine is apparent from the foregoing, but briefly described as follows: The beans pass down the tube 18 or are otherwise delivered into the machine, and are given their initial breaking up between the breaker elements 36 and 37. The broken pieces pass down between the table 20 and ring 13 to the table 22 from which they are thrown outwardly against the ring 14 and drop down onto the table 23. The blades 43 create an outward flow of air so that the air blast entering through the pipe 42 will not impede the delivery of beans into the machine and the flow of broken pieces from the initial breakers to the successive breakers. The nibs are further broken up between the second set of breakers 38, 40, and pass between the ring 14 and table 23 and thence between the ring 15 and table 24, to be further broken up by the fourth set of breakers 39, 41. The stream of air passing upwardly over the tables 23, 24 and 25 and upwardly around the rings 13, 14 and 15, will carry with it the shells, dust and other lighter foreign matter, to discharge same into the receptacle 8 from which they may be subsequently removed at intervals.

The nibs and germs then drop from the table 25 and are thrown by centrifugal force and air draft into and through the nib and germ separator. The nibs are compelled to jump through the openings 57 of the baffles 56 and to pass under the baffles 58, as shown by the arrows in Fig. 1, and the nibs cannot pass down below the table 45 so that they pass out through the openings 59. The germs are arrested by the baffles and drop down through the clearances between the table 45 and the baffles 56 and trough rim 4. The blade or flap 49 moves the germs around the trough to the outlet 50.

Having thus described the invention, what is claimed as new is:

1. A machine of the character described comprising a cylindrical ring and a table rotatable relatively to one another and having a space therebetween, the ring having breaking elements extending inwardly over the table, and the table having cooperable breaking elements movable under the aforesaid elements.

2. A machine of the character described comprising a cylindrical ring, and a rotatable table having its marginal portion spaced a predetermined distance from the ring for the passage of broken articles between them, said ring having breaking elements extending inwardly over the table, and the table having cooperable breaking elements movable under the aforesaid elements.

3. A machine of the character described comprising a cylindrical ring and a table rotatable relatively to one another and having a space therebetween, the ring having breaking elements extending inwardly over the table, and the table having cooperable breaking elements movable under the aforesaid elements, and means for delivering a blast of air over said table to carry off shells and lighter particles.

4. A machine of the character described comprising a series of cylindrical rings and a series of tables cooperable therewith and rotatable relatively thereto, with decreasing spaces between the successive rings and tables, said rings and tables being arranged so that the particles pass from one table move to the next table, the rings having breaking elements extending inwardly over the corresponding tables, and the tables having cooperable breaking elements movable under the aforesaid elements.

5. A machine of the character described comprising a series of cylindrical rings and a series of tables cooperable therewith and rotatable relatively thereto, with decreasing spaces between the successive rings and tables, said rings and tables being arranged so that the particles pass from one table move to the next table, said tables being spaced apart, and means for directing a blast of air to pass outwardly over said tables and upwardly between said rings, the rings having breaking elements extending inwardly over the tables, and the tables having cooperable breaking elements movable under the aforesaid breaking elements.

6. A machine of the character described comprising a series of concentric rings in conical arrangement, and vertically spaced tables mounted for rotation and having their edges cooperable with and spaced from the rings to provide clearances of decreasing sizes in succession downwardly, the rings having breaking elements extending inwardly over the tables, and the tables having cooperable breaking elements movable under the aforesaid breaking elements.

7. A machine of the character described comprising a series of concentric rings in conical arrangement, and vertically spaced tables mounted for rotation and having their edges cooperable with and spaced from the rings to provide clearances of decreasing sizes in succession downwardly, said rings having breaking elements extending inwardly over the tables, the tables having cooperable breaking elements movable under the aforesaid breaking elements, said tables having central openings, and means for directing a blast of air into said openings to pass over said tables.

8. A machine of the character described comprising a series of concentric rings in conical arrangement, and vertically spaced tables mounted for rotation and having their edges cooperable with and spaced from the rings to provide clearances of decreasing sizes in succession downwardly, said tables and rings having cooperable breaking elements, means for directing a blast of air centrally of said tables to pass outwardly over the tables and upwardly between said rings, a cone over said rings, and a receptacle having an upstanding cone therein fitted over the firstnamed cone for catching shells and lighter particles.

9. A machine of the character described comprising a cylindrical ring and a table rotatable relatively to one another and having a space therebetween and cooperable breaking elements, said ring and table being separable to permit stones and the like to pass through.

10. A machine of the character described comprising a series of rings, a rotor having a series of tables cooperable with said rings, said rings and tables being spaced apart with decreasing clearances in succession, and means for mounting the rotor for vertical movement to permit separation of the tables from said rings for the passage therebetween of stones and the like.

11. A machine of the character described comprising a series of rings, a series of rotary tables spaced decreasing distances in succession from the rings, said rings and tables having cooperable breaking elements, means for delivering articles to the uppermost table, means for directing a blast of air to pass outwardly over lower tables, and fan blades carried by one table to create a blast of air away from said uppermost table.

12. A machine of the character described comprising a rotatable annularly-slotted table, baffles above and cooperable with said table to permit germs of broken cocoa beans or the like to pass downwardly through said slots, and means for delivering a blast of air to pass outwardly over said table and past said baffles to carry the nibs past the baffles.

13. In a machine of the character described a germ and nib separator comprising a rotatable table having an annular slot, an annular baffle depending in said slot to permit germs of broken cocoa beans or the like to drop through said slot, said baffle having openings above the table for the passage of the nibs, and means for supplying a blast of air outwardly over said table.

14. In a machine of the character described a separator for the germs and nibs of broken cocoa beans or the like, comprising a rotary table having annular slots defining rings, depending annular baffles above said rings, other depending annular baffles entering said slots to prevent the nibs passing though said slots and permitting the germs to pass through, the second named baffles having openings above the table, and means for creating an outward blast of air over said table.

15. In a machine of the character described a separator for germs and nibs of broken cocoa beans or the like, comprising a rotary annularly-slotted table, means for directing a blast of air outwardly over said table, and baffles cooperable with said table to permit the germs and not the nibs to pass through the table.

16. In a machine of the character described a separator for the germs and nibs of broken cocoa beans and the like, comprising a rotary table having annular slots, means for directing a blast of air outwardly over said table to carry the nibs and germs with it, and baffles cooperable with said table to permit germs and not the nibs to pass through said slots and requiring the nibs to move upwardly from the table in passing over the slots and downwardly between the slots.

17. A machine for breaking cocoa beans and the like and removing the shells and germs therefrom, comprising a stator and a rotor movable therein, said stator and rotor having cooperable breaking portions for breaking cocoa beans, or the like, and having air passages for the removal of the shells from the nibs or broken bean fragments, said stator and rotor having other cooperable portions to receive said nibs and arrange for separating the germs and nibs.

In testimony whereof I hereunto affix my signature.

SWINFEN BRAMLEY-MOORE.